(12) United States Patent
Kucherov et al.

(10) Patent No.: US 10,983,962 B2
(45) Date of Patent: Apr. 20, 2021

(54) PROCESSING DEVICE UTILIZING POLYNOMIAL-BASED SIGNATURE SUBSPACE FOR EFFICIENT GENERATION OF DEDUPLICATION ESTIMATE

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 224 days.

(21) Appl. No.: 15/991,054

(22) Filed: May 29, 2018

(65) Prior Publication Data
US 2019/0370355 A1    Dec. 5, 2019

(51) Int. Cl.
    *G06F 16/174*    (2019.01)
    *G06F 3/06*      (2006.01)
    *G06F 16/901*    (2019.01)

(52) U.S. Cl.
    CPC ........ *G06F 16/1756* (2019.01); *G06F 3/0608* (2013.01); *G06F 3/0641* (2013.01); *G06F 16/9014* (2019.01)

(58) Field of Classification Search
    CPC ............. G06F 16/1748; G06F 16/1752; G06F 16/1756; G06F 3/06
    (Continued)

(56) References Cited

U.S. PATENT DOCUMENTS 7,165,155 B1    1/2007  Duprey et al.
7,440,982 B2   10/2008  Lu et al.
(Continued)

FOREIGN PATENT DOCUMENTS

WO    2016111954 A1    7/2016
WO  PCT/US2019/024885  1/2020
(Continued)

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Giovanna B Colan
(74) *Attorney, Agent, or Firm* — Ryan, Mason & Lewis, LLP

(57) ABSTRACT

An apparatus in one embodiment comprises at least one processing device comprising a processor coupled to a memory. The processing device is configured to identify a dataset to be scanned to generate a deduplication estimate for that dataset, to designate a subset inclusion characteristic to be utilized in the scan, and for each of a plurality of pages of the dataset, to scan the page, where scanning the page includes computing a polynomial-based signature for the page, determining whether or not the polynomial-based signature satisfies the designated subset inclusion characteristic, and responsive to the polynomial-based signature satisfying the designated subset inclusion characteristic, computing a content-based signature for the page and updating a corresponding entry of a deduplication estimate table for the dataset based at least in part on the content-based signature. The processing device generates the deduplication estimate for the dataset based at least in part on contents of the deduplication estimate table.

20 Claims, 7 Drawing Sheets

(58) Field of Classification Search
USPC .................................................. 707/692
See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,053,032 | B2* | 6/2015 | Sengupta ............ G06F 12/0862 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 10,635,533 | B2 | 4/2020 | Schneider et al. |
| 10,684,915 | B2 | 6/2020 | Schneider et al. |
| 10,691,355 | B2 | 6/2020 | Kucherov et al. |
| 10,691,373 | B2 | 6/2020 | Harduf et al. |
| 10,691,551 | B2 | 6/2020 | Meiri et al. |
| 10,698,772 | B2 | 6/2020 | Hu et al. |
| 10,705,965 | B2 | 7/2020 | Shveidel et al. |
| 10,719,253 | B2 | 7/2020 | Alkalay et al. |
| 10,725,855 | B2 | 7/2020 | Shani et al. |
| 10,754,559 | B1 | 8/2020 | Meiri et al. |
| 10,754,575 | B2 | 8/2020 | Stronge |
| 10,754,736 | B2 | 8/2020 | Shani et al. |
| 10,761,933 | B2 | 9/2020 | Moore et al. |
| 10,783,038 | B2 | 9/2020 | Moore et al. |
| 10,817,385 | B2 | 10/2020 | Meiri et al. |
| 10,824,512 | B2 | 11/2020 | Resnik et al. |
| 10,826,990 | B2 | 11/2020 | Kamran et al. |
| 10,831,407 | B2 | 11/2020 | Glimcher et al. |
| 10,831,735 | B2 | 11/2020 | Schneider et al. |
| 10,838,863 | B2 | 11/2020 | Kamran et al. |
| 10,846,178 | B2 | 11/2020 | Meiri |
| 10,852,965 | B2 | 12/2020 | Glimcher et al. |
| 10,852,974 | B2 | 12/2020 | Kucherov et al. |
| 10,852,999 | B2 | 12/2020 | Schneider et al. |
| 10,860,234 | B2 | 12/2020 | Stronge et al. |
| 10,860,241 | B2 | 12/2020 | Meiri et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0083346 | A1 | 4/2010 | Forman et al. |
| 2010/0179941 | A1 | 7/2010 | Agrawal et al. |
| 2010/0318804 | A1 | 12/2010 | Volkovs |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0318051 | A1* | 11/2013 | Kumar ................ G06F 16/1748 |
| | | | 707/692 |
| 2013/0325824 | A1 | 12/2013 | Shoens |
| 2014/0052699 | A1 | 2/2014 | Harnik et al. |
| 2014/0136490 | A1* | 5/2014 | Saliba ................ G06F 16/1748 |
| | | | 707/692 |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0034489 | A1 | 2/2016 | Lewis et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0344410 | A1 | 11/2016 | Dubey |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2017/0212907 | A1* | 7/2017 | VanderSpek ........ G06F 16/1748 |
| 2017/0262466 | A1* | 9/2017 | Amit ................... G06F 3/0683 |
| 2018/0074745 | A1* | 3/2018 | Harnik ................ G06F 3/0641 |
| 2018/0075104 | A1 | 3/2018 | Oberbreckling et al. |
| 2018/0095873 | A1 | 4/2018 | Nakagoe et al. |
| 2019/0163764 | A1* | 5/2019 | Ioannou ............... G06F 3/067 |
| 2019/0303490 | A1 | 10/2019 | Chen et al. |
| 2019/0370354 | A1 | 12/2019 | Kucherov et al. |
| 2019/0370356 | A1 | 12/2019 | Kucherov et al. |
| 2019/0370357 | A1 | 12/2019 | Kucherov et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2020/0218601 | A1 | 7/2020 | Schneider et al. |
| 2020/0218610 | A1 | 7/2020 | Schneider et al. |
| 2020/0225849 | A1 | 7/2020 | Meiri et al. |
| 2020/0226023 | A1 | 7/2020 | Meiri |
| 2020/0226145 | A1 | 7/2020 | Meiri |
| 2020/0233704 | A1 | 7/2020 | Alkalay et al. |
| 2020/0233705 | A1 | 7/2020 | Alkalay et al. |
| 2020/0233881 | A1 | 7/2020 | Harduf et al. |
| 2020/0242130 | A1 | 7/2020 | Chen et al. |
| 2020/0249868 | A1 | 8/2020 | Glimcher et al. |
| 2020/0249869 | A1 | 8/2020 | Glimcher et al. |
| 2020/0250089 | A1 | 8/2020 | Kamran et al. |
| 2020/0250144 | A1 | 8/2020 | Natanzon et al. |
| 2020/0272542 | A1 | 8/2020 | Meiri et al. |
| 2020/0285268 | A1 | 9/2020 | Meiri et al. |
| 2020/0285402 | A1 | 9/2020 | Meiri et al. |
| 2020/0301784 | A1 | 9/2020 | Chen |
| 2020/0310649 | A1 | 10/2020 | Chen et al. |
| 2020/0310654 | A1 | 10/2020 | Meiri et al. |
| 2020/0326877 | A1 | 10/2020 | Chen et al. |
| 2020/0327024 | A1 | 10/2020 | Alkalay et al. |
| 2020/0341641 | A1 | 10/2020 | Kucherov et al. |
| 2020/0341682 | A1 | 10/2020 | Kucherov et al. |
| 2020/0341749 | A1 | 10/2020 | Bashi et al. |
| 2020/0364106 | A1 | 11/2020 | Chen et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

(56) References Cited

OTHER PUBLICATIONS

Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Y. Zhang et al., "End-to-End Integrity for File Systems: A ZFS Case Study," Proceedings of the 8th USENIX Conference on File and Storage Technologies (FAST), Feb. 23-26, 2010, 14 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
U.S. Appl. No. 15/884,577 filed in the name of Zvi Schneider et al. filed Jan. 31, 2018 and entitled "Storage System with Decoupling and Reordering of Logical and Physical Capacity Removal."
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al. filed Jul. 28, 2017, and entitled "Token-Based Data Flow Control in a Clustered Storage System."
U.S. Appl. No. 15/793,121 filed in the name of David Meiri et al. filed Oct. 25, 2017, and entitled "Opportunistic Compression of Replicated Data in a Content Addressable Storage System."
U.S. Appl. No. 15/824,536 filed in the name of Christopher Sayles et al. filed Nov. 28, 2017, and entitled "Storage System with Asynchronous Messaging between Processing Modules for Data Replication."
U.S. Appl. No. 16/265,131 filed in the name of Lior Kamran et al. filed Feb. 1, 2019, and entitled "Storage System with Write Cache Release Protection."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/396,897 filed in the name of Anton Kucherov et al. filed Apr. 29, 2019, and entitled "Storage System with Deduplication-Aware Replication Implemented Using a Standard Storage Command Protocol."
U.S. Appl. No. 16/413,050 filed in the name of Xiangping Chen et al. filed May 15, 2019, and entitled "Storage System with Coordinated Recovery across Multiple Input-Output Journals of Different Types."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25, 2019, and entitled "Storage System with Throughput-Based Timing of Synchronous Replication Recovery."
U.S. Appl. No. 16/665,651 filed in the name of Lior Kamran et al. filed Oct. 28, 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tal filed Nov. 25, 2019, and entitled "Storage System with Prioritized Raid Rebuild."
D. Harnik et al., "Estimation of Deduplication Ratios in Large Data Sets," 2012 IEEE 28th Symposium on Mass Storage Systems and Technologies, 2012, 11 pages.
J. Zhou et al., "Counting YouTube Videos via Random Prefix Sampling," ACM Internet Measurement Conference, 2011, 9 pages.
Oracle, " Database Administrator's Guide," Oracle EPM 11.1.2.4, 2016, 10 pages.
S. Idreos et al., "Estimating the Compression Fraction of an Index using Sampling," ICDE Conference, 2010, 4 pages.
M. Dietzfelbinger et al., "Polynomial Hash Functions are Reliable," International Conference on Automata, Languages and Programming, 1992, 12 pages.
E. Klitzke, "CRCs vs Hash Functions," https://eklitzke.org/crcs-vs-hash-functions, Jun. 12, 2016, 2 pages.
L. Pennington, "Using Data from a Random Sample to Make Predictions," https://study.com/academy/lesson/using-data-from-a-random-sample-to-make-predictions.html, Accessed Aug. 6, 2020, 3 pages.
Y. Tille, "Sampling Algorithms," International Encyclopedia of Statistical Science, 2011, 5 pages.

\* cited by examiner

PROCESSING DEVICE UTILIZING POLYNOMIAL-BASED SIGNATURE SUBSPACE FOR EFFICIENT GENERATION OF DEDUPLICATION ESTIMATE

FIELD

The field relates generally to information processing systems, and more particularly to storage in information processing systems.

BACKGROUND

In many information processing systems, it is desirable to implement deduplication functionality in order to ensure that the same data is not repeatedly stored in a duplicative manner that consumes excessive storage capacity. Deduplication decisions in some systems are guided by deduplication estimates, which can provide an indication of the amount of storage capacity that would be released if deduplication were performed. However, conventional approaches to deduplication can be problematic. For example, in some systems, generating a deduplication estimate for a set of logical storage volumes can require substantial computational and memory resources. These and other related deduplication inefficiencies can significantly undermine system performance.

SUMMARY

Illustrative embodiments provide techniques for efficient generation of deduplication estimates for datasets of a storage system through utilization of polynomial-based signature subspaces in scanning pages of the datasets. Such arrangements can considerably reduce the amounts of computational and memory resources that are required to generate deduplication estimates, thereby leading to improved deduplication decisions and associated improvements in system performance.

In one embodiment, an apparatus comprises at least one processing device comprising a processor coupled to a memory. The processing device is configured to identify a dataset to be scanned to generate a deduplication estimate for that dataset, to designate a subset inclusion characteristic to be utilized in the scan, and for each of a plurality of pages of the dataset, to scan the page by computing a polynomial-based signature for the page, determining whether or not the polynomial-based signature satisfies the designated subset inclusion characteristic, and responsive to the polynomial-based signature satisfying the designated subset inclusion characteristic, computing a content-based signature for the page and updating a corresponding entry of a deduplication estimate table for the dataset based at least in part on the content-based signature. The processing device generates the deduplication estimate for the dataset based at least in part on contents of the deduplication estimate table.

The processing device in some embodiments is implemented in a host device configured to communicate over a network with a storage system that stores the dataset. In other embodiments, the processing device is implemented in the storage system itself. These are only examples, and alternative implementations are possible.

The dataset illustratively comprises a set of one or more logical storage volumes, with each of the one or more logical storage volumes comprising at least a portion of a physical storage space of the storage system.

The deduplication estimate table in some embodiments comprises a plurality of entries for respective ones of the pages, with each of the entries being configured to include a page identifier that comprises less than an entire content-based signature of its corresponding page. For example, the page identifier in a corresponding one of the entries may comprise a specified number of initial bytes of the content-based signature of that page.

The designated subset inclusion characteristic may specify that application of a designated function to the polynomial-based signature produces a particular result.

In some embodiments, the polynomial-based signature comprises an n-bit cyclic redundancy check (CRC) value, such as a 32-bit CRC value. In an arrangement of this type, the designated subset inclusion characteristic may specify that performing a designated modulo arithmetic operation on the n-bit CRC value produces a particular value. Other types of polynomial-based signatures can be used in other embodiments.

In some embodiments, updating a corresponding entry of the deduplication estimate table for a given one of the pages of the dataset proceeds as follows. If a page identifier of the given page is not already present in the deduplication estimate table, the page identifier is inserted into the deduplication estimate table and an associated counter is set to an initial value. On the other hand, if the page identifier of the given page is already present in the deduplication estimate table, its associated counter is incremented. Other types of updating processes and deduplication estimate table configurations may be used in other embodiments.

In some embodiments, generating the deduplication estimate for the dataset based at least in part on contents of the deduplication estimate table further comprises computing a partial deduplication estimate based at least in part on values of counters associated with respective entries of the deduplication estimate table, and scaling the partial deduplication estimate to obtain the deduplication estimate for the dataset.

The processing device may be configured in some embodiments to generate one or more additional deduplication estimates for respective ones of one or more additional datasets, and to select a particular one of the datasets for deduplication based at least in part on their respective deduplication estimates.

Additional or alternative operations may be performed based at least in part on a generated deduplication estimate. For example, the processing device may be configured to adjust one or more characteristics of a storage configuration of a dataset based at least in part on the deduplication estimate generated for the dataset.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
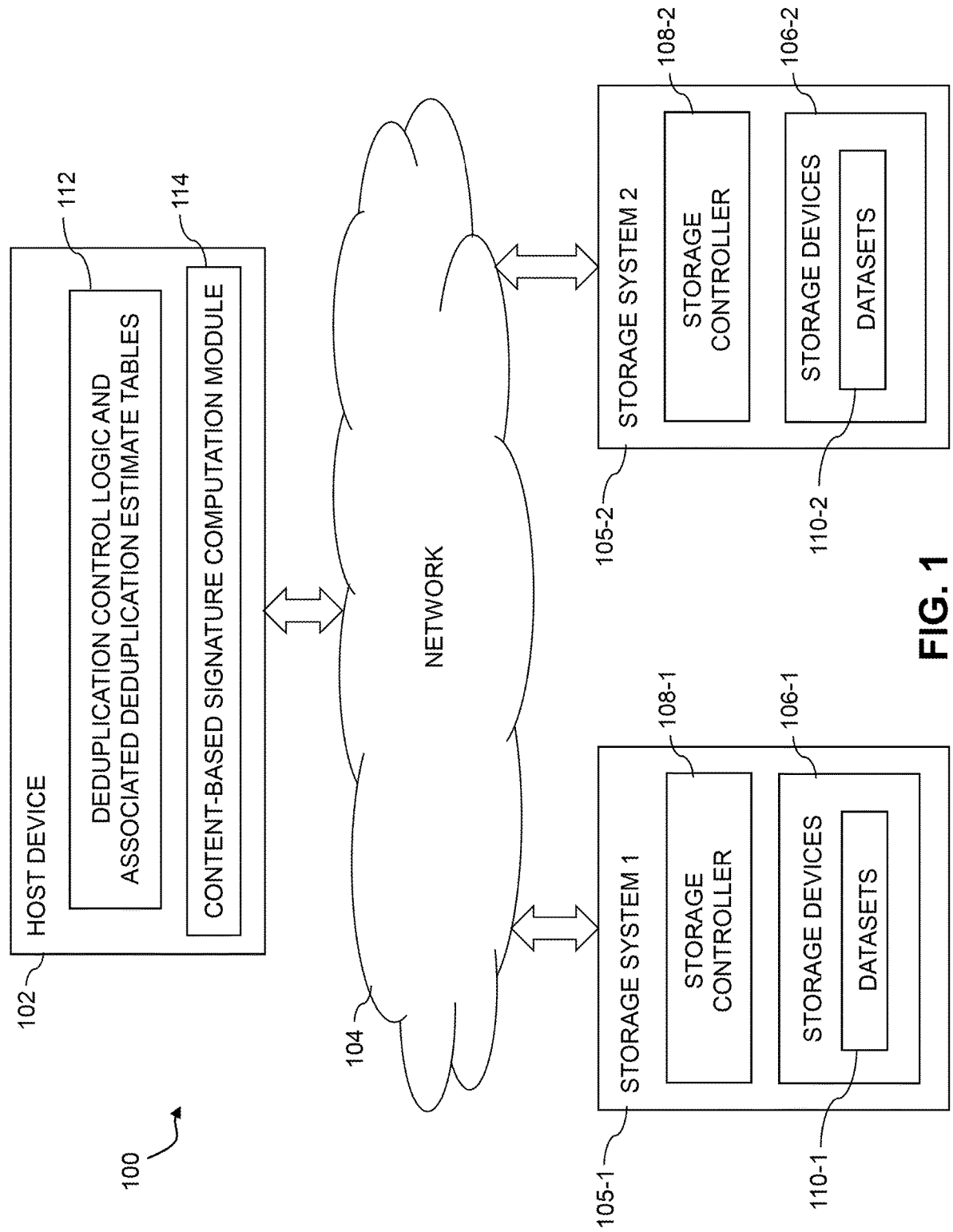
FIG. 1 is a block diagram of an information processing system comprising a host device configured with functionality for efficient generation of deduplication estimates for datasets in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108. The storage devices 106-1 and 106-2 store respective datasets 110-1 and 110-2, collectively datasets 110.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes deduplication control logic and associated deduplication estimate tables, collectively represented by module 112. The deduplication control logic is configured to control performance of a deduplication estimate generation process such as that illustrated in the flow diagram of FIG. 3. The deduplication estimate tables are maintained in a memory of the host device 102 under the control of the deduplication control logic. An example deduplication estimate table format will be described below in conjunction with FIG. 4. The host device 102 further comprises a content-based signature computation module 114, and should also be understood to include additional modules and other components typically found in conventional implementations of computers, servers or other host devices, although such additional modules and other components are omitted from the figure for clarity and simplicity of illustration.

The host device 102 via its deduplication control logic is configured to identify a dataset to be scanned to generate a deduplication estimate for that dataset, to designate a subset inclusion characteristic to be utilized in the scan, and for each of a plurality of pages of the dataset, to scan the page. Scanning the page illustratively comprises computing a polynomial-based signature for the page, determining whether or not the polynomial-based signature satisfies the designated subset inclusion characteristic, and responsive to the polynomial-based signature satisfying the designated subset inclusion characteristic, computing a content-based signature for the page in the content-based signature computation module 114 and updating a corresponding entry of a deduplication estimate table for the dataset based at least in part on the content-based signature. The host device 102 then generates the deduplication estimate for the dataset based at least in part on contents of the deduplication estimate table.

For example, in some implementations of the FIG. 1 embodiment, the first storage system 105-1 may comprise a traditional storage array without content-based deduplication functionality while the second storage system 105-2 comprises a content addressable storage array with content-based deduplication functionality. In such an arrangement, the host device 102 can generate deduplication estimates for different ones of the datasets 110-1 of the first storage system 105-1 and use the resulting deduplication estimates to prioritize particular ones of the datasets for migration to the second storage system 105-2. Accordingly, the host device 102 can implement an automated migration process that obtains deduplication estimates for different ones of the datasets 110-1 and migrates only those datasets that are likely to achieve at least a threshold level of deduplication upon migration to the second storage system 105-2. A given dataset when stored in the first storage system 105-1 may therefore have significant unexploited deduplication potential that can be achieved upon migration to the second storage system 105-2. The generation of deduplication estimates in the host device 102 can support these and numerous other use cases relating to storage configuration in system 100.

A given dataset to be scanned by the host device 102 to generate a deduplication estimate illustratively comprises a set of one or more logical units (LUNs) or other logical storage volumes of a particular one of the storage systems 105. However, the term "dataset" as used herein is intended to be broadly construed, and may include other types and arrangements of data, including snapshots, or portions thereof.

The deduplication estimate table illustratively comprises a plurality of entries for respective ones of the pages, with each of the entries being configured to include a page identifier that comprises less than an entire content-based signature of its corresponding page. The entries also include respective counters for the pages having page identifiers in the table. The counters are used to track the number of times that pages having the corresponding page identifier appear in the dataset being scanned.

The designated subset inclusion characteristic illustratively specifies that application of a designated function to a polynomial-based signature computed for a given page of the dataset produces a particular result. For example, in some embodiments, the polynomial-based signature of the page comprises an n-bit CRC value, such as a 32-bit CRC value, and the designated subset inclusion characteristic specifies that performing a designated modulo arithmetic operation on the n-bit CRC value produces a particular value. The subset inclusion characteristic effectively establishes a particular subspace of a total scan space comprising all possible polynomial-based signatures. Such CRC computation functionality is assumed to be implemented as part of the deduplication control logic of module 112 of host device 102.

The content-based signatures illustratively comprise hash digests of their respective pages, each generated by application of a hash function such as the well-known Secure Hashing Algorithm 1 (SHA1) to its corresponding page. It is also possible that other types of content-based signatures may be used, such as hash handles of the type described elsewhere herein. A given content-based signature in illustrative embodiments is unique to the particular content of the page from which it is generated, such that two pages with exactly the same content will have the same content-based signature, while two pages with different content will have different content-based signatures.

The polynomial-based signatures are substantially less costly to compute in terms of computational resources than the content-based signatures. For example, in some embodiments the polynomial-based signatures do not guarantee unique signatures for pages having different content, while as noted above the content-based signatures do guarantee unique signatures for pages having different content.

It is therefore possible that pages having different content in some embodiments can have the same polynomial-based signature. For example, in computing the polynomial-based signature of a given page, the deduplication control logic of the host device 102 may utilize only a designated portion of the page content, such as the first 100 bytes of the page, rather than the entire content of that page. The computationally inexpensive polynomial-based signatures are used to identify in a particularly efficient manner those pages of the dataset that satisfy the designated subset inclusion characteristic.

As one example, the polynomial-based signatures may be generated by applying a 32-bit CRC to the first 100 bytes of each page, and each polynomial-based signature is tested against the designated subset inclusion characteristic by applying a modulo 256 arithmetic operation to that signature and determining if the result matches at least one particular specified value. Adjustments can be made in one or more of the number of page bytes used to generate the polynomial-based signatures, the type of modulo arithmetic operation applied and the number of specified matching values in order to control the size of the subspace established by the designated subset inclusion characteristic.

In updating a corresponding entry of the deduplication estimate table for a given one of the pages of the dataset, the host device 102 first determines if a page identifier of the given page is already present in the deduplication estimate table. If the page identifier is not already present in the deduplication estimate table, the host device 102 inserts the page identifier into the deduplication estimate table and sets the associated counter for that entry to an initial value, typically a value of one. If the page identifier is already present in the deduplication estimate table, the host device 102 increments the associated counter for that entry, typically by increasing its current value by one. The page identifier illustratively comprises a designated number of initial bytes of the content-based signature of that page.

The polynomial-based signatures in many cases are substantially uniformly distributed over the total scan space of possible polynomial-based signature values. As a result, the subspace established by the designated subset inclusion characteristic is also substantially uniformly distributed. The size of the subspace can be controlled in a straightforward manner by simply adjusting the subset inclusion characteristic as noted above.

The ratio of the subspace established by the subset inclusion characteristic to the total scan space of all possible polynomial-based signatures more particularly provides a sampling ratio for the scanning process.

In some embodiments, the page identifier comprises a designated number of initial bytes of the content-based signature for that page, where the designated number is greater than or equal to four. As a more particular example, the designated number may be five, such that the page identifier comprises five initial bytes. Other page identifier lengths and configurations may be used in other embodiments.

The host device 102 may be configured to adjust at least one of an amount of computational resources and an amount of memory resources to be utilized in the scan of the dataset at least in part by altering a length of the page identifier.

As another example, the host device 102 can trade off accuracy of the deduplication estimate with the amount of computational or memory resources required to generate the estimate. For example, the host device 102 can select a length of the page identifier in order to achieve a rate of false positives in the deduplication estimate that is less than a specified maximum rate of false positives.

In some embodiments, generating the deduplication estimate for a dataset based at least in part on contents of the deduplication estimate table further comprises computing a partial deduplication estimate based at least in part on values of the counters associated with respective entries of the deduplication estimate table, and scaling the partial deduplication estimate to obtain the deduplication estimate for the dataset. For example, the counter values can be summed and the resulting partial deduplication estimate scaled through multiplication by an inverse of the above-noted sampling ratio.

The deduplication estimate in some embodiments is in the form of a deduplication ratio, which indicates a potential reduction in size of the dataset if it were subject to a deduplication operation. Other types of deduplication estimates can be used in other embodiments, and such estimates therefore should not be viewed as limited to deduplication ratios or any other particular estimate format.

Various automated actions may be taken in at least one of the host device 102 and the storage systems 105 based at least in part on deduplication estimates generated in the manner described above.

For example, the host device 102 can adjust one or more characteristics of a storage configuration of a given dataset based at least in part on the deduplication estimate generated for the dataset. In the present embodiment, this can include migrating the dataset from the first storage system 105-1 to the second storage system 105-2, or vice versa.

As another example, the host device 102 can generate multiple deduplication estimates for respective datasets, and select a particular one of the datasets for deduplication based at least in part on their respective deduplication estimates. The host device 102 can send a command to one of the storage systems 105 directing that deduplication be performed on the selected dataset in that storage system, assuming that the commanded storage system supports deduplication functionality.

The illustrative embodiments described above avoid excessive consumption of computational and memory resources that could otherwise result if the content-based signatures for all of the pages in the dataset had to be stored and compared in conjunction with scanning the dataset. For example, illustrative embodiments provide significant performance advantages over an arrangement which computes the content-based signature of each page of the dataset and determines for each of the content-based signatures how many times the exact same content-based signature appears. Such an arrangement would not only require large amounts of memory to store a table having a separate entry for each full content-based signature and its associated counter, but would also be very inefficient in terms of processor and cache utilization. This is due at least in part to the typical random nature of the content-based signatures, which would tend to result in frequent memory cache misses and associated accesses to slower storage resources in conjunction with the scan. A possible alternative approach would be to scan only a portion of the dataset, but such an approach would clearly not produce accurate deduplication estimates.

For example, consider a simple dataset having a sequence of pages with content of the form ABCDABCD. In this example, even if one were to select either the entire first half or the entire second half of the dataset for scanning, the resulting deduplication estimate would be highly inaccurate, erroneously indicating zero deduplication potential.

These and other issues are addressed and overcome by the illustrative embodiments, which as described previously utilize a designated subset inclusion characteristic that is applied to computationally inexpensive polynomial-based signatures to establish a subspace of the total scan space. Such an arrangement can be used to generate highly accurate deduplication estimates using substantially reduced amounts of computational and storage resources. The partial deduplication estimate for the subspace is scaled to infer the deduplication estimate for the full dataset. With reference again to the simple example of the dataset having a sequence of pages with content of the form ABCDABCD, use of a designated subset inclusion characteristic using polynomial-based signatures common to pages with content A would result in a deduplication estimate indicating potential deduplication by a factor of 2, accurately reflecting that the size of the dataset can be reduced in half through deduplication.

In some embodiments, a process for generating a deduplication estimate in the system 100 includes the following operations:

1. Determine the size of the dataset to be scanned and what portion of the dataset should be sampled to provide an acceptable margin of error in the deduplication estimate.

2. Determine the subset inclusion characteristic for the desired sampling. For example, to establish a subspace of polynomial-based signatures that is a fraction 1/256 of a total scan space of possible polynomial-based signature values, the subset inclusion characteristic may specify that application of a modulo 256 arithmetic operation to the polynomial-based signatures results in a particular value.

3. Determine the size of the page identifier to be utilized in the deduplication estimate table. For example, the above-noted SHA1 hash function produces a 20-byte content-based signature, but the page identifier is selected as a number of initial bytes of the content-based signature. In such cases, a page identifier that is five bytes in length will yield a very low rate of false positives.

4. Scan the dataset by computing polynomial-based signatures for the pages. If a given polynomial-based signature satisfies the subset inclusion characteristic, the page identifier of that page is added to the deduplication estimate table with an initial counter value of one. If the page identifier is already in the table, its counter is incremented by one.

5. Upon completion of the scan, a partial deduplication estimate is generated for the subspace by summing the counter values and that result is scaled to generate the deduplication estimate for the full dataset.

These and other operations carried out in conjunction with a process for generating deduplication estimates in the host device 102 are illustratively performed at least in part under the control of the deduplication control logic of module 112. Such operations utilize the associated deduplication estimate tables as well as content-based signatures generated for respective pages by the content-based signature computation module 114.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108 and datasets 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing deduplication estimate functionality will be described below.

Figure 2:
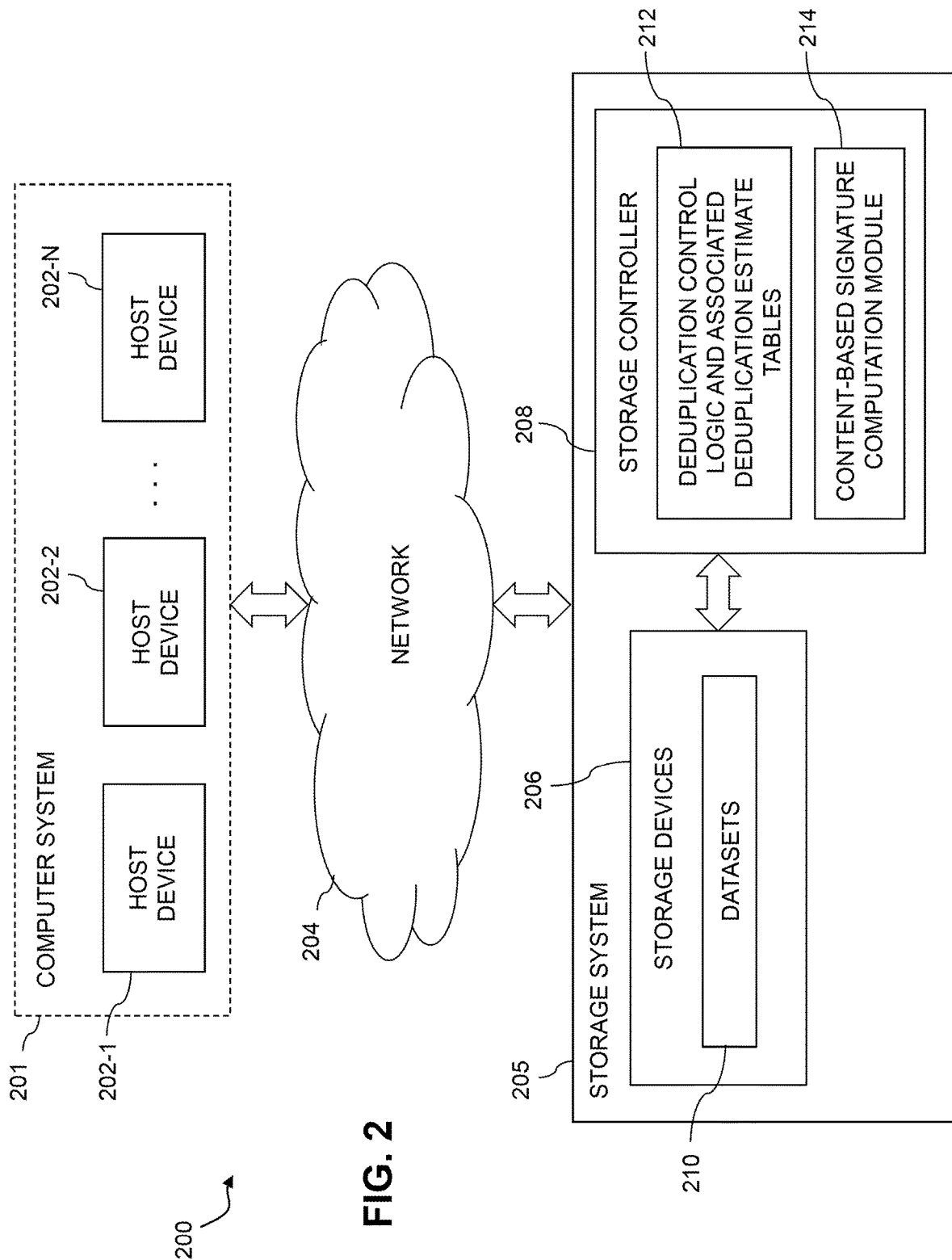
FIG. 2 is a block diagram of an information processing system comprising a storage system configured with functionality for efficient generation of deduplication estimates for datasets in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208 and datasets 210. However, in this embodiment, the deduplication estimate generation functionality is implemented in the storage system 205, rather than in one of the host devices 202. Accordingly, the storage controller 208 in this embodiment comprises modules 212 and 214, which are configured to operate in substantially the same manner as that described above for respective corresponding modules 112 and 114 of the host device 102 in the system 100. The module 212 is assumed to implement CRC computation functionality or other types of functionality for computing polynomial-based signatures in the storage controller 208 of system 200.

In some embodiments, functionality for deduplication estimate generation and associated automated processing based at least in part on the resulting deduplication estimates can be implemented partially in a host device and partially in a storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. The process as shown includes steps 300 through 320, and is suitable for use in systems 100 and 200 but is more generally applicable to other types of information processing systems in which a host device or storage system is configured to generate a deduplication estimate for a dataset and to take one or more automated actions based at least in part on the generated deduplication estimate. The steps are illustratively performed at least in part under the control of the deduplication control logic implemented in module 112 in host device 102 of system 100 or in module 212 in storage controller 208 of system 200.

In step 300, a dataset is identified. The identified dataset is a dataset to be scanned to generate a deduplication estimate for that dataset. The dataset is illustratively one of a plurality of datasets stored in a storage system, such as one of the datasets 110-1 or 110-2 stored in respective storage systems 105-1 and 105-2 of system 100, or one or the datasets 210 stored in the storage system 205 of system 200. The identified dataset illustratively comprises a set of one or more LUNs or other logical storage volumes of the storage system.

In step 302, a subset inclusion characteristic is designated to be utilized in the scan. The designated subset inclusion characteristic illustratively specifies that application of a designated function to a polynomial-based signature computed for a given page of the dataset produces a particular result. For example, in some embodiments, the polynomial-based signature of the page comprises an n-bit CRC value, such as a 32-bit CRC value, and the designated subset inclusion characteristic specifies that performing a designated modulo arithmetic operation on the n-bit CRC value produces a particular value. Other types of polynomial-based signatures can be used in other embodiments. The subset inclusion characteristic effectively establishes a particular subspace of a total scan space comprising all possible polynomial-based signatures. The ratio of the subspace established by the subset inclusion characteristic to the total scan space of all possible polynomial-based signatures more particularly provides a sampling ratio in the FIG. 3 process for the identified dataset.

In step 304, a particular unscanned page of the identified dataset is selected. The term "unscanned page" in this context simply means that the page has not yet been scanned in conjunction with the current scan of the dataset, although it may have been previously scanned in conjunction with prior scans. In a first pass through step 304, all pages of the dataset are unscanned and so the selected unscanned page can be any page of the dataset, while in a second pass through step 304, all pages of the dataset other than the particular page selected in the first pass through step 304 remain unscanned, and so on. At a final pass through step 304, there is only one remaining unscanned page of the dataset, and that page is selected.

In step 306, a polynomial-based signature is computed for the particular page selected in step 304. The polynomial-based signature is illustratively computed using an n-bit CRC as indicated above. Such CRC computation functionality is assumed to be implemented as part of the deduplication control logic of module 112 of host device 102 in system 100 or module 212 of storage controller 208 in system 200.

As mentioned previously, the polynomial-based signatures are substantially less computationally expensive to generate than content-based signatures. For example, in some embodiments, the polynomial-based signatures are generated from a particular designated portion of each page, such as the first 100 bytes of the page, using a relatively simple operation such as a 32-bit CRC, while the content-based signatures are computed by applying a relatively complex operation such as SHA1 to the entire content of the page. The present embodiment avoids the need to compute a computationally complex content-based signature for each page of a dataset in generating a deduplication estimate for that dataset.

In step 308, a determination is made as to whether or not the polynomial-based signature computed in step 306 satisfies the designated subset inclusion characteristic. If the polynomial-based signature satisfies the designated subset inclusion characteristic, the process moves to step 310, and otherwise moves to step 314 as indicated.

In step 310, a content-based signature is computed for the page. The content-based signature is illustratively computed using SHA1 or another type of secure hashing algorithm. Such a computation is assumed to be performed utilizing content-based signature computation module 114 of host device 102 in system 100 or content-based signature computation module 214 of storage controller 208 in system 200.

In step 312, a corresponding entry of a deduplication estimate table for the dataset is updated using the content-based signature computed in step 310. The process then moves to step 314. The deduplication estimate table illustratively comprises a plurality of entries for respective ones of the pages, with each of the entries being configured to include a page identifier that comprises less than an entire content-based signature of its corresponding page.

Figure 4:
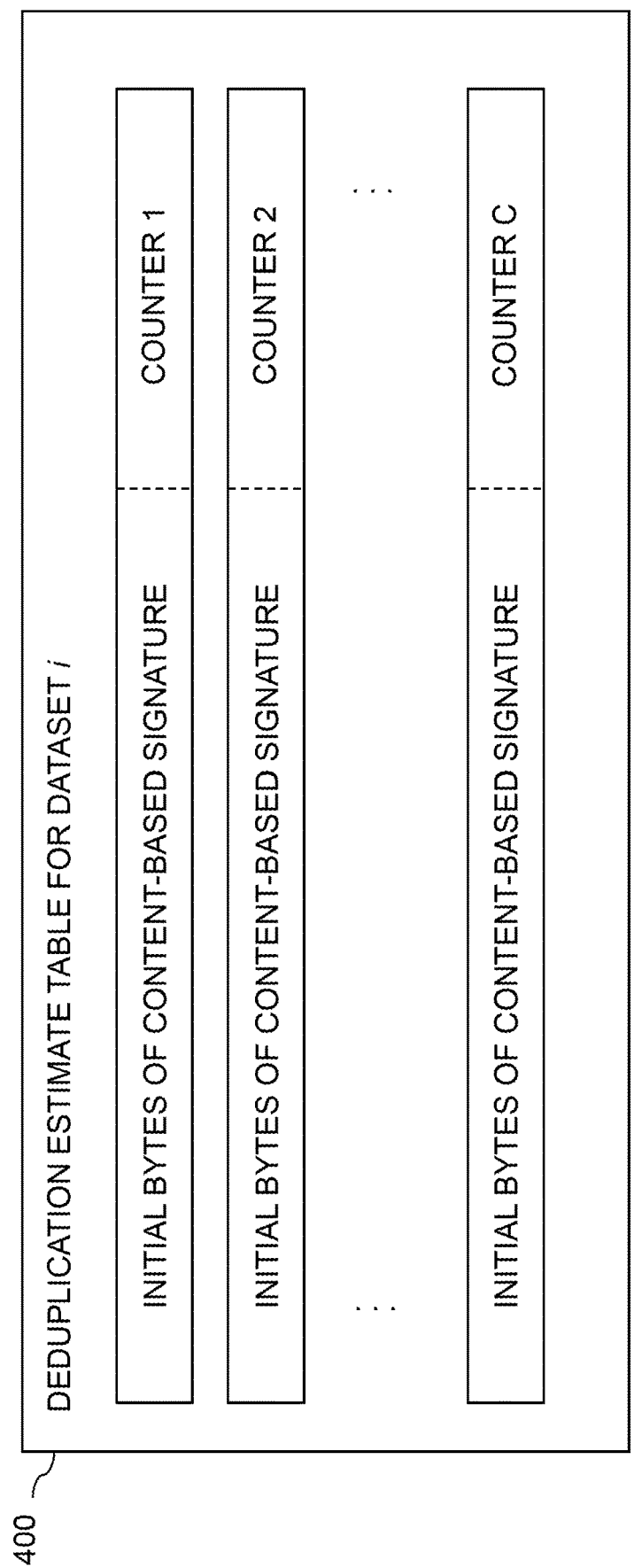
FIG. 4 shows an example of a deduplication estimate table in an illustrative embodiment.

An example of an arrangement of this type is shown in FIG. 4, which shows a deduplication estimate table 400 for a given dataset i in an illustrative embodiment. The page identifier in a corresponding entry of the deduplication estimate table 400 comprises a particular number of initial bytes of the content-based signature of that page. Each of the entries of the deduplication estimate table 400 in this example therefore comprises a page identifier that includes initial bytes of the content-based signature of that page, as well as a corresponding counter. In this example, there are C entries in the table, and thus the counters are denoted Counter 1, Counter 2, . . . Counter C as indicated in the figure.

Other arrangements of table fields can be used, and the term "table" as used herein is intended to be broadly construed so as to encompass numerous alternative data structures for maintaining information used in generating a deduplication estimate.

In some embodiments, the page identifier comprises a designated number of initial bytes of the content-based signature for that page, where the designated number is greater than or equal to four. As a more particular example, the designated number may be five, such that the page identifier comprises five initial bytes. Other page identifier lengths and configurations may be used in other embodiments.

Also, a processing device as disclosed herein may be configured to adjust at least one of an amount of computational resources and an amount of memory resources to be utilized in the scan of the identified dataset at least in part by altering the length of the page identifier.

Additionally or alternatively, the processing device may be configured to select a length of the page identifier in order to achieve a rate of false positives in the resulting deduplication estimate that is less than a specified maximum rate of false positives.

The updating of the corresponding entry of the deduplication estimate table for a given one of the pages of the dataset in step 312 illustratively proceeds in the following manner. If a page identifier of the given page is not already present in the deduplication estimate table, the page identifier is inserted into the deduplication estimate table and an associated counter is set to an initial value, typically a value of one. On the other hand, if the page identifier of the given page is already present in the deduplication estimate table, its associated counter is incremented. It is to be appreciated that other types of updating processes and deduplication estimate table configurations may be used in other embodiments.

Accordingly, the particular table configuration shown in FIG. 4 is only an example, and should not be construed as limiting in any way. Also, the term "table" as used herein is intended to be broadly construed, and a given table can be implemented using a wide variety of different data structures or other storage arrangements.

In step 314, a determination is made as to whether or not there is at least one additional page to be scanned in the identified dataset. If there is at least one additional page to be scanned, the process returns to step 304 to select an unscanned page for scanning. Otherwise, the process moves to step 316.

In step 316, the contents of the deduplication estimate table are utilized to generate a deduplication estimate for dataset. For example, a partial deduplication estimate may be computed based at least in part on values of the counters associated with respective entries of the deduplication estimate table. This illustratively involves summing the values of the counters, although other functions of the counter values could be computed in other embodiments. The resulting summation of counter values provides a partial deduplication estimate indicative of the amount of storage capacity reduction that can be achieved by applying a deduplication operation to the dataset. This partial deduplication estimate is then scaled to obtain the deduplication estimate for the dataset. The scaling illustratively involves multiplying the partial deduplication estimate by an inverse of the sampling ratio, where the sampling ratio as described above is given by the ratio of the subspace of polynomial-based signatures defined by the subset inclusion characteristic to the total scan space of all possible polynomial-based signatures. Again, other types of scaling can be used in other embodiments.

In step 318, a determination is made as to whether or not there is at least one additional dataset to be scanned to generate a deduplication estimate for that dataset. If there is at least one additional dataset to be scanned, the process returns to step 300 to identify another dataset for scanning. Otherwise, the process ends in step 320.

Figure 3:
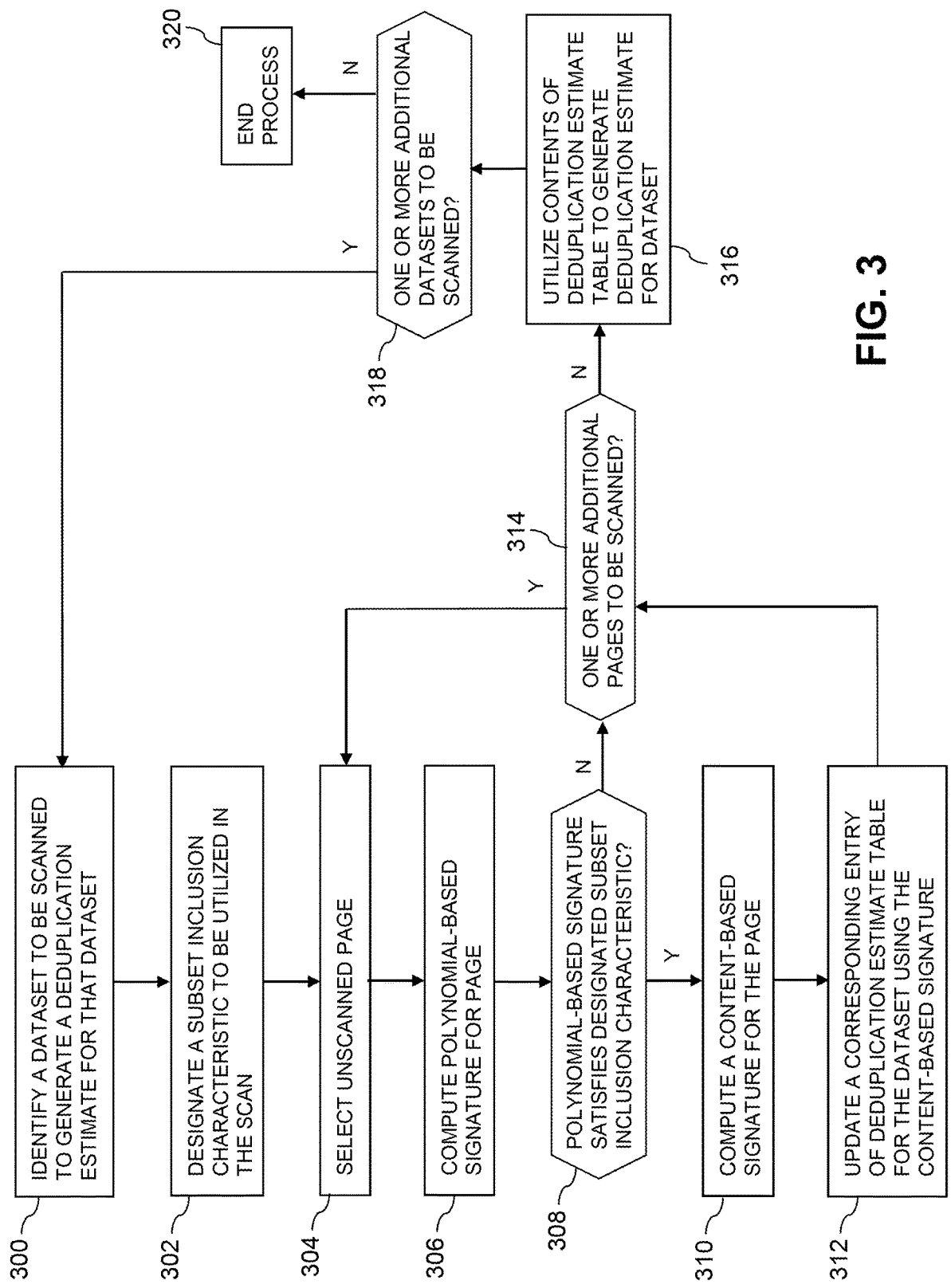
FIG. 3 is a flow diagram of a process for efficient generation of deduplication estimates for datasets in an illustrative embodiment.

The deduplication estimates generated using the FIG. 3 process are utilized to perform one or more automated operations in at least one of a host device and a storage system. For example, the processing device may be configured to adjust one or more characteristics of a storage configuration of a given dataset based at least in part on the deduplication estimate generated for that dataset.

This may include, for example, determining whether to store the dataset in a first storage system that does not have deduplication functionality or in a second storage system that has deduplication functionality.

As another example, the processing device may generate multiple distinct estimates for different groupings of data into datasets in order to determine a particular manner in which to group the data to achieve maximum deduplication in a given storage system or in conjunction with determination of an appropriate migration of the dataset from a first storage system of a first type to a second storage system of a second type.

In some embodiments, the processing device is configured to generate multiple deduplication estimates for respective different datasets, and to select a particular one of the datasets for deduplication based at least in part on their respective deduplication estimates. For example, the dataset having the highest-valued deduplication estimate may be prioritized for deduplication in a storage system over other datasets having lower-valued deduplication estimates. These and numerous other automated actions may be taken utilizing deduplication estimates generated using the FIG. 3 process.

In some embodiments, the deduplication estimates are utilized in an artificial intelligence (AI) engine that controls migration of datasets or other storage configuration characteristics of datasets.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for generating deduplication estimates. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different deduplication estimation processes for respective different datasets or for different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the FIG. 3 process in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate deduplication estimate generation techniques as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 205, and accordingly is assumed to be coupled to host devices 202 of computer system 201 via network 204 within information processing system 200.

The storage controller 508 in the present embodiment is configured to implement deduplication estimate generation functionality of the type previously described in conjunction with FIGS. 1 through 4.

The storage controller 508 includes distributed modules 512 and 514, which are configured to operate in a manner similar to that described above for respective corresponding modules 112, 212 and 114, 214.

Figure 5:
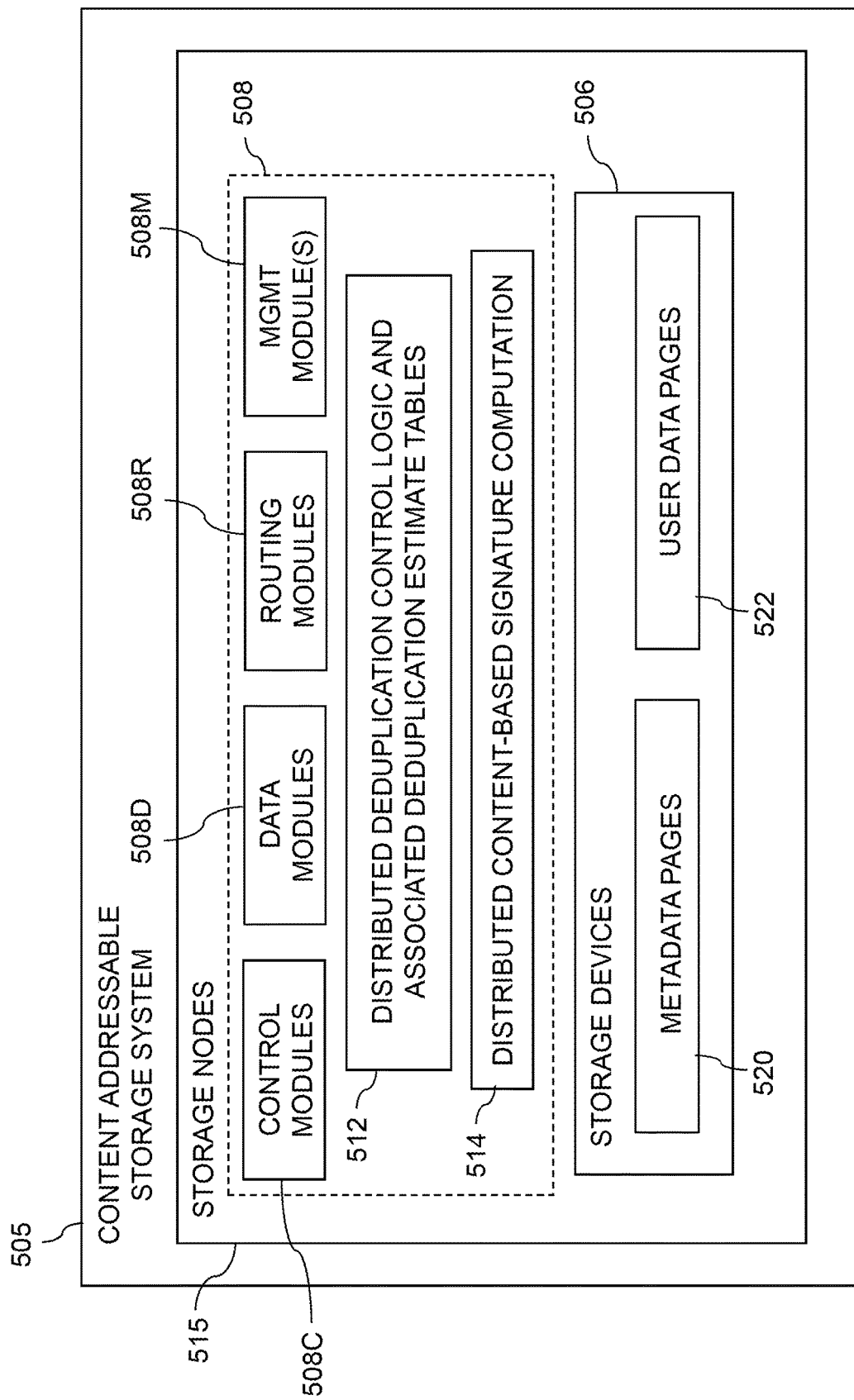
FIG. 5 shows a content addressable storage system having a distributed storage controller configured with functionality for efficient generation of deduplication estimates for datasets in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled to network 204. Alternatively, such additional storage nodes may be part of another clustered storage system of the system 200. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP and Transmission Control Protocol (TCP). For example, respective sets of IP links used in data transfer and corresponding messaging could be associated with respective different ones of the routing modules 508R.

Although shown as separate modules of the distributed storage controller 508, the modules 512 and 514 in the present embodiment are assumed to be distributed at least in part over at least a subset of the other modules 508C, 508D, 508R and 508M of the storage controller 508. Accordingly, at least portions of the deduplication estimate generation functionality of the modules 512 and 514 may be implemented in one or more of the other modules of the storage controller 508. In other embodiments, the modules 512 and 514 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 522 can include any type of user data that may be utilized in the system 200. The term "user data" herein is therefore also intended to be broadly construed.

A given dataset for which a deduplication estimate is generated using modules 512 and 514 illustratively comprises a set of LUNs, each including multiple ones of the user data pages 522 stored in storage devices 506.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 522. The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. It should be noted that usage of the variable n in this user data page context is unrelated to its usage elsewhere herein in the content of an n-bit CRC.

Each of the user data pages 522 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The deduplication estimate generation functionality provided by modules 512 and 514 in this embodiment is assumed to be distributed across multiple distributed processing modules, including at least a subset of the processing modules 508C, 508D, 508R and 508M of the distributed storage controller 508.

For example, the management module 508M of the storage controller 508 may include deduplication control logic that engages corresponding deduplication control logic instances in all of the control modules 508C and routing modules 508R in order to implement a deduplication estimate generation process.

In some embodiments, the content addressable storage system 505 comprises an XtremIO™ storage array suitably modified to incorporate techniques for generation of deduplication estimates and performance of automated functions based at least in part on those estimates as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, deduplication estimate generation functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more I/O operations directing that at least one data item of the storage system 505 be written to in a particular manner. A given write request is illustratively received in the storage system 505 from a host device, illustratively one of the host devices 202. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more I/O operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various I/O processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement deduplication estimate generation functionality in a clustered storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with deduplication estimate generation functionality as disclosed herein can provide a number of significant advantages relative to conventional arrangements.

For example, some embodiments provide techniques for efficient generation of deduplication estimates for datasets of a storage system through utilization of polynomial-based signature subspaces in scanning pages of the datasets.

The polynomial-based signatures are substantially less computationally expensive to generate than content-based signatures. Illustrative embodiments advantageously avoid the need to compute content-based signatures for each page of a dataset in generating a deduplication estimate for that dataset.

Functionality for deduplication estimate generation and associated automated processing based at least in part on the resulting deduplication estimates can be implemented in a host device, in a storage system, or partially in a host device and partially in a storage system.

Illustrative embodiments can be configured to generate highly accurate deduplication estimates in a manner that does not require large amounts of host device or storage system memory. For example, these embodiments avoid the need to store a complete content-based signature for each data page encountered during a scan, thereby conserving valuable memory resources of the host device or storage system.

Some embodiments can be dynamically reconfigured to trade off performance measures such as rate of false positives with amounts of computational and memory resources consumed by the scan.

These and other embodiments can considerably reduce the amounts of computational and memory resources that are required to generate deduplication estimates, thereby leading to improved deduplication decisions and associated improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with deduplication estimate generation functionality will now be described in greater detail with reference to FIGS. 6 and 7. Although described in the context of system 100, these platforms may also be used to implement at least portions of other information processing systems in other embodiments.

Figure 6:
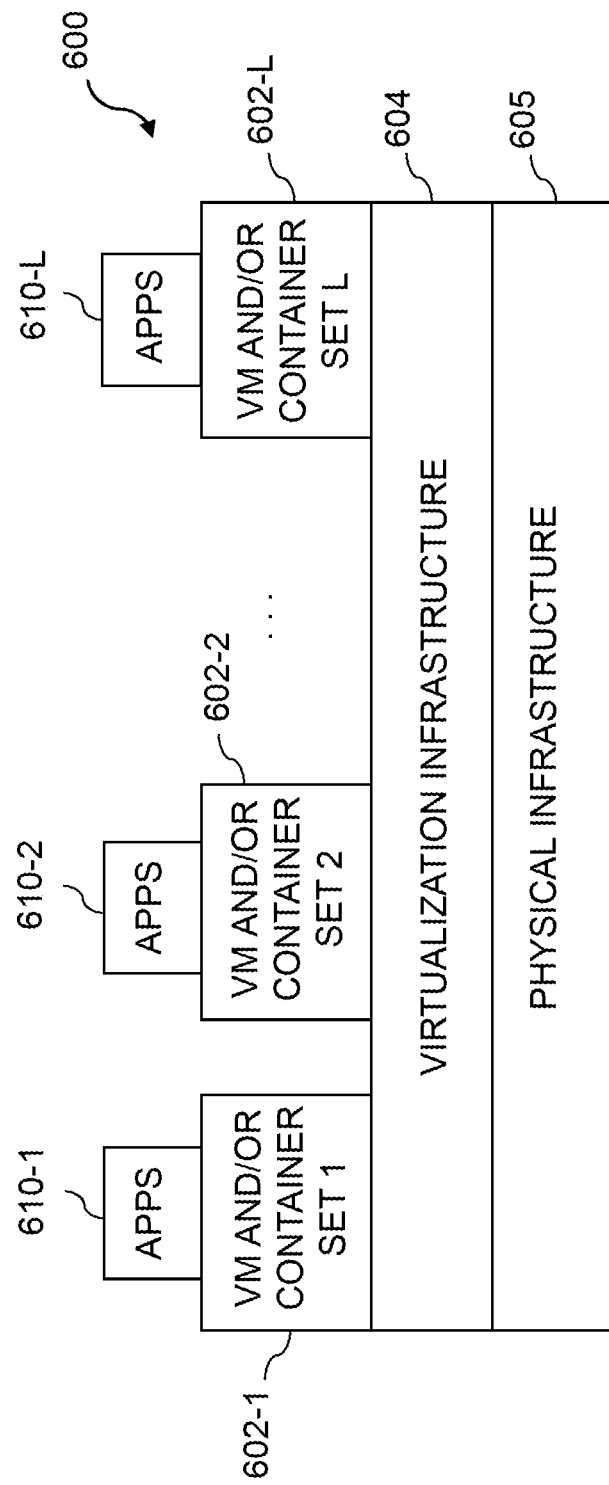
FIGS. 6 and 7 show examples of processing platforms that may be utilized to implement at least a portion of an information processing system in illustrative embodiments.
Figure 7:
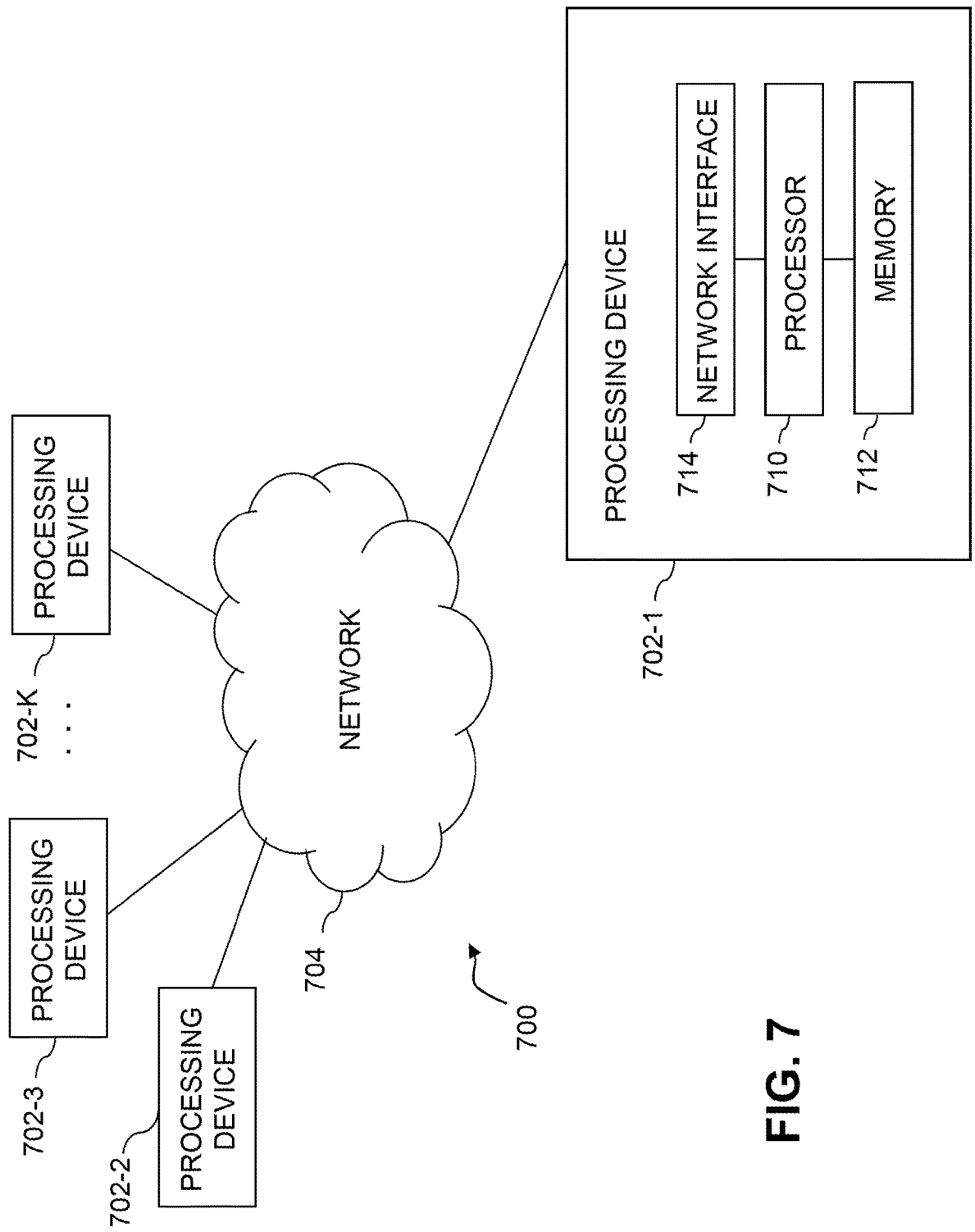

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the deduplication estimate generation functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, deduplication estimate generation processes and associated control logic and tables. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the processing device being configured:
to identify a dataset to be scanned to generate a deduplication estimate for that dataset;
to designate a subset inclusion characteristic to be utilized in the scan;
for each of a plurality of pages of the dataset, to scan the page by:
computing a polynomial-based signature for the page;
determining whether or not the polynomial-based signature satisfies the designated subset inclusion characteristic; and
responsive to the polynomial-based signature satisfying the designated subset inclusion characteristic, computing a content-based signature for the page and updating a corresponding entry of a deduplication estimate table for the dataset based at least in part on the content-based signature; and
to generate the deduplication estimate for the dataset based at least in part on contents of the deduplication estimate table;
wherein for a first one of the pages for which the polynomial-based signature of that page satisfies the designated subset inclusion characteristic, a content-based signature is computed for that page and an update is made to the deduplication estimate table; and
wherein for a second one of the pages for which the polynomial-based signature of that page does not satisfy the designated subset inclusion characteristic, a content-based signature is not computed for that page and no update is made to the deduplication estimate table;
the designated subset inclusion characteristic thereby establishing a sampling ratio of the pages for the scan;

the designated subset inclusion characteristic specifying that application of a designated function to the polynomial-based signature produces a particular result; and the designated function comprising a designated modulo arithmetic operation.

2. The apparatus of claim 1 wherein the processing device is implemented in one of:
   a host device configured to communicate over a network with a storage system that stores the dataset; and
   the storage system that stores the dataset.

3. The apparatus of claim 1 wherein the dataset comprises a set of one or more logical storage volumes of a storage system.

4. The apparatus of claim 1 wherein updating a corresponding entry of the deduplication estimate table for a given one of the pages of the dataset comprises one of the following operations (i) and (ii):
   (i) responsive to a page identifier of the given page not already being present in the deduplication estimate table, inserting the page identifier into the deduplication estimate table and setting an associated counter to an initial value; and
   (ii) responsive to the page identifier already being present in the deduplication estimate table, incrementing its associated counter.

5. The apparatus of claim 1 wherein the deduplication estimate table comprises a plurality of entries for respective ones of the pages and wherein each of the entries is configured to include a page identifier that comprises less than an entire content-based signature of its corresponding page.

6. The apparatus of claim 5 wherein the processing device is configured to adjust at least one of an amount of computational resources and an amount of memory resources to be utilized in the scan of the dataset at least in part by altering a length of the page identifier.

7. The apparatus of claim 5 wherein the processing device is configured to select a length of the page identifier in order to achieve a rate of false positives in the deduplication estimate that is less than a specified maximum rate of false positives.

8. The apparatus of claim 1 wherein the polynomial-based signature comprises an n-bit cyclic redundancy check (CRC) value.

9. The apparatus of claim 8 wherein the n-bit CRC value comprises a 32-bit CRC value.

10. The apparatus of claim 1 wherein the designated subset inclusion characteristic specifies that performing the designated modulo arithmetic operation on the polynomial-based signature produces a particular value.

11. The apparatus of claim 1 wherein generating the deduplication estimate for the dataset based at least in part on contents of the deduplication estimate table further comprises:
   computing a partial deduplication estimate based at least in part on values of counters associated with respective entries of the deduplication estimate table; and
   scaling the partial deduplication estimate to obtain the deduplication estimate for the dataset.

12. The apparatus of claim 1 wherein the processing device is configured to adjust one or more characteristics of a storage configuration of the dataset based at least in part on the deduplication estimate generated for the dataset.

13. The apparatus of claim 1 wherein the processing device is configured:
   to generate one or more additional deduplication estimates for respective ones of one or more additional datasets; and
   to select a particular one of the datasets for deduplication based at least in part on their respective deduplication estimates.

14. A method comprising:
   identifying a dataset to be scanned to generate a deduplication estimate for that dataset;
   designating a subset inclusion characteristic to be utilized in the scan;
   for each of a plurality of pages of the dataset, scanning the page by:
      computing a polynomial-based signature for the page;
      determining whether or not the polynomial-based signature satisfies the designated subset inclusion characteristic; and
      responsive to the polynomial-based signature satisfying the designated subset inclusion characteristic, computing a content-based signature for the page and updating a corresponding entry of a deduplication estimate table for the dataset based at least in part on the content-based signature; and
   generating the deduplication estimate for the dataset based at least in part on contents of the deduplication estimate table;
   wherein for a first one of the pages for which the polynomial-based signature of that page satisfies the designated subset inclusion characteristic, a content-based signature is computed for that page and an update is made to the deduplication estimate table; and
   wherein for a second one of the pages for which the polynomial-based signature of that page does not satisfy the designated subset inclusion characteristic, a content-based signature is not computed for that page and no update is made to the deduplication estimate table;
   the designated subset inclusion characteristic thereby establishing a sampling ratio of the pages for the scan;
   the designated subset inclusion characteristic specifying that application of a designated function to the polynomial-based signature produces a particular result; and
   the designated function comprising a designated modulo arithmetic operation;
   wherein the method is implemented by at least one processing device comprising a processor coupled to a memory.

15. The method of claim 14 wherein the polynomial-based signature comprises an n-bit cyclic redundancy check (CRC) value.

16. A computer program product comprising a non-transitory processor-readable storage medium having stored therein program code of one or more software programs, wherein the program code when executed by at least one processing device causes said at least one processing device:
   to identify a dataset to be scanned to generate a deduplication estimate for that dataset;
   to designate a subset inclusion characteristic to be utilized in the scan;

for each of a plurality of pages of the dataset, to scan the page by:
computing a polynomial-based signature for the page;
determining whether or not the polynomial-based signature satisfies the designated subset inclusion characteristic; and
responsive to the polynomial-based signature satisfying the designated subset inclusion characteristic, computing a content-based signature for the page and updating a corresponding entry of a deduplication estimate table for the dataset based at least in part on the content-based signature; and
to generate the deduplication estimate for the dataset based at least in part on contents of the deduplication estimate table;
wherein for a first one of the pages for which the polynomial-based signature of that page satisfies the designated subset inclusion characteristic, a content-based signature is computed for that page and an update is made to the deduplication estimate table; and
wherein for a second one of the pages for which the polynomial-based signature of that page does not satisfy the designated subset inclusion characteristic, a content-based signature is not computed for that page and no update is made to the deduplication estimate table;
the designated subset inclusion characteristic thereby establishing a sampling ratio of the pages for the scan;
the designated subset inclusion characteristic specifying that application of a designated function to the polynomial-based signature produces a particular result; and
the designated function comprising a designated modulo arithmetic operation.

17. The computer program product of claim 16 wherein the polynomial-based signature comprises an n-bit cyclic redundancy check (CRC) value.

18. The computer program product of claim 16 wherein the designated subset inclusion characteristic specifies that performing the designated modulo arithmetic operation on the polynomial-based signature produces a particular value.

19. The computer program product of claim 16 wherein generating the deduplication estimate for the dataset based at least in part on contents of the deduplication estimate table further comprises:
computing a partial deduplication estimate based at least in part on values of counters associated with respective entries of the deduplication estimate table; and
scaling the partial deduplication estimate to obtain the deduplication estimate for the dataset.

20. The method of claim 14 wherein the designated subset inclusion characteristic specifies that performing the designated modulo arithmetic operation on the polynomial-based signature produces a particular value.

* * * * *